Dec. 11, 1956 C. M. GLADIS 2,773,342

MULTIPLE GANG DISK HARROW

Filed Sept. 20, 1954 4 Sheets-Sheet 1

INVENTOR.
CYRIL M. GLADIS.
BY
Christy, Parmelee & Strickland
ATTORNEYS.

INVENTOR.
CYRIL M. GLADIS.

BY Christy, Parmelee & Strickland

ATTORNEYS.

MULTIPLE GANG DISK HARROW

Filed Sept. 20, 1954 4 Sheets-Sheet 3

INVENTOR.
CYRIL M. GLADIS.

BY

*Christy, Parmelee & Strickland*

ATTORNEYS.

MULTIPLE GANG DISK HARROW

Filed Sept. 20, 1954

INVENTOR.
CYRIL M. GLADIS.

BY

Christy, Parmelee & Strickland

ATTORNEYS.

2,773,342

MULTIPLE GANG DISK HARROW

Cyril M. Gladis, Aliquippa, Pa., assignor to Pittsburgh Forgings Company, Coraopolis, Pa., a corporation of Delaware Application September 20, 1954, Serial No. 457,124

17 Claims. (Cl. 55—83)

This invention relates, as indicated, to a multiple gang disk harrow and, more particularly, is directed to an improved mounting frame and linkage system for controlling the relative positions of harrow gangs having universal connections with the frame and which operate in such manner that a weight transfer action similar to a rigid frame mounting is obtained without tilting or disturbing the position of the frame.

More specifically, the invention is directed to harrows of the type having front and rear pairs of laterally spaced gangs of disks respectively having axes extending transversely of a mounting frame, the positions of which are angularly adjustable with respect to the path of movement of the mounting frame to provide a desired tilling action. In harrows of this type, the advantages of a rigid mounting fixing the positions of the gangs with respect to their mounting frame are well known. With a rigid mounting, movement of one of the gangs over a clod or mound of soil will tilt the frame and cause part of the weight of the remaining gangs to be transferred to the one gang to render it more effective for the purpose of leveling the obstruction. However, this type of mounting presents a disadvantage when the obstruction is a rock or other unbreakable material and in such case damage to the equipment may result. The rigid mounting, in addition, is suitable only for tilling level soil for the reason that the gangs will not ride uniformly over an uneven surface but on the contrary will concentrate their action on points of high elevation in such surface. To eliminate these disadvantages, harrows have been constructed with the gangs mounted for universal movement on the harrow frame so that the various gangs may tilt and ride over obstructions and be more effective in tilling ground of an irregular contour but such universal mountings have accomplished their purpose only by sacrificing, at least in part, the weight transfer action of rigid mountings.

One of the principal objects of this invention is to provide a harrow construction which provides the advantages of both the rigid and universal gang mountings of conventional harrows. To this end, universal connections are provided for mounting the gangs on a harrow frame and there is provided an improved linkage system for adjusting the positions of the gangs of disks transversely and angularly with respect to the path of movement of the harrow. In a manner to be described, the linkage system interconnects the disk gangs and is mounted for vertical movement relative to the frame so that tilting movement of one of the gangs about its universal mounting can be effected only by imparting a vertical movement to the linkage system. The remaining gangs, being connected with the leverage system, are effective to resist such tilting movement of the one gang and thus have a portion of their weight transferred to the gang being tilted, and this is accomplished without disturbing the planar position of the harrow frame.

Having mentioned that the weight transfer action of the harrow gangs is accomplished without disturbing the planar position of the harrow frame, it will be apparent that the harrow of this invention is particularly adapted for use with conventional tractor hitches of the type providing a power lift for movement of agricultural implements between transport and ground engaging positions. Such hitches commonly include a pair of laterally spaced draft bars which are connected with laterally spaced draft connections on an implement for pulling the implement along a path trailing the tractor. The draft bars have connections with power operated links by which they are rotated to raise and lower the implement. To render the draft bars effective to raise and lower the implement, a compression link is connected between the tractor and the implement, the connection of the compression link to the implement being at a point centrally of and vertically above its draft connections and generally at the upper end of a vertical standard secured to the implement frame. The implement draft and compression connections thus have a triangular arrangement relative to each other, commonly designated a three-point tractor hitch, which provides a rigid linkage rendering the tractor lift effective to raise and lower the implement. However, when the implement is in its ground engaging position, the rigid linkage of the three-point hitch resists movement of the implement frame out of a predetermined planar position relative to the tractor. More particularly, and in the case of multiple gang harrows, the three-point hitch resists tilting of the harrow frame which is essential to proper harrow operation when the harrow gangs have a rigid mounting on the frame. The feature of this invention in providing for tilting movement of the harrow gangs and a weight transfer action without disturbing the position of the harrow frame renders it particularly suitable for use with three-point tractor hitches and constitutes a further object of the invention. This object is accomplished while at the same time distributing among the harrow gangs the weight of the frame and increased downward thrust thereon from the tractor compression link in response to conditions tending to tilt the frame about its draft connections and thus providing an improved harrowing action in a manner to be described.

Other objects and advantages of the invention will be apparent from the following description.

In the drawings, there is shown a preferred embodiment of the invention. In this showing:

Figure 1:
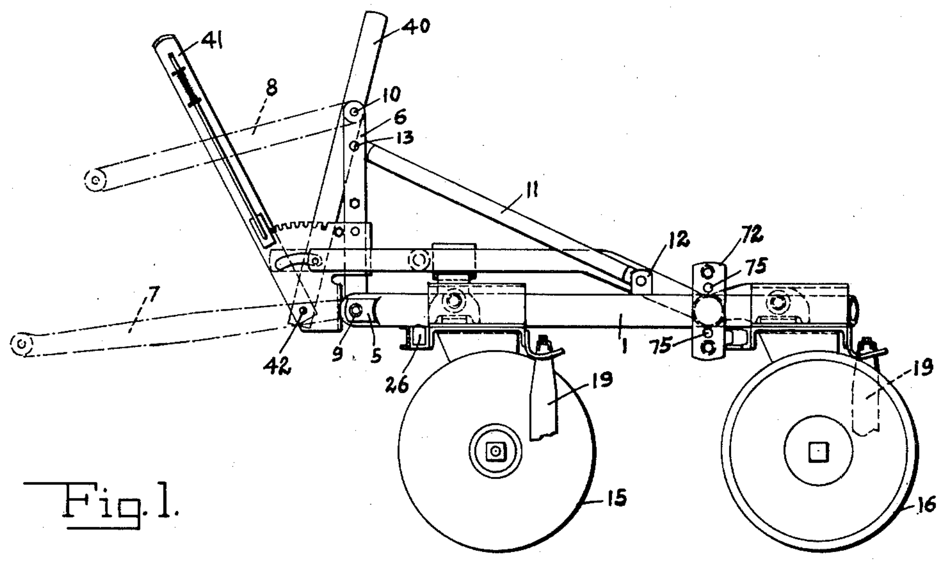
Fig. 1 is a side elevational view, parts thereof being broken away, of a harrow constructed in accordance with the principles of this invention.
Figure 4:
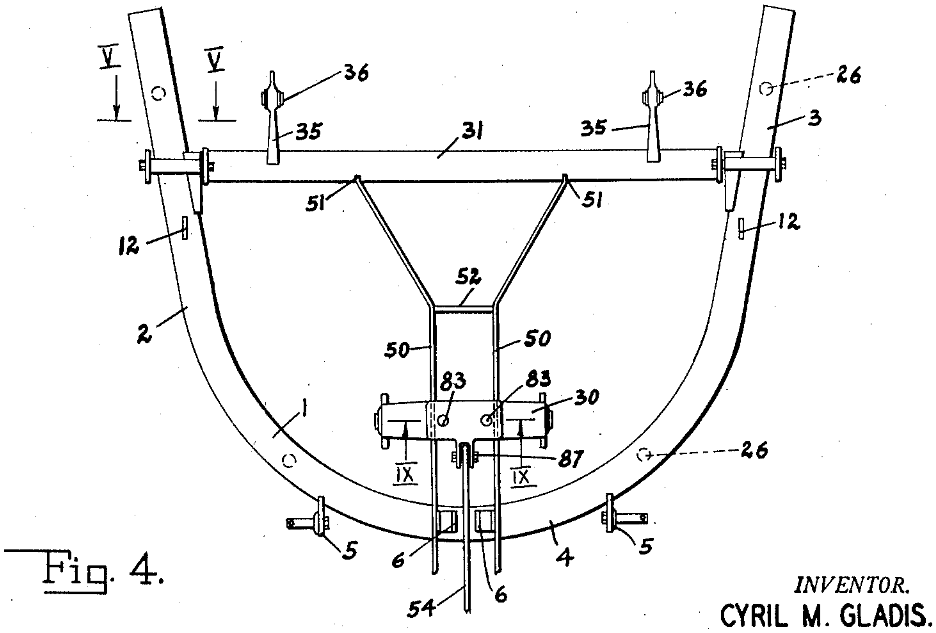
Fig. 4 is a plan view of the harrow frame and a portion of the linkage system for adjusting the positions of the gangs of harrow disks.

Referring first to Fig. 4, the harrow frame 1 is illustrated as having a pair of laterally spaced arms 2 and 3 extending rearwardly from its front end 4. While the frame 1 is illustrated as having a tubular construction of U-shape, it will be understood that it may be fabricated of channel or other structural sections, and that other forms of frames are contemplated. The front end 4 is provided with a pair of laterally spaced draft connections 5 and a pair of vertically extending supports or standards 6 for connection in a conventional three-point tractor hitch. Such hitches commonly include a pair of laterally spaced draft bars 7 and a compression link 8 designated schematically by broken lines in Fig. 1. Each of the draft connections 5 has a pivotal connection at 9 with an end of one of the draft bars 7 which has its other end pivotally connected to the tractor. The upper ends of the vertical supports or standards 6 carry a pivot 10 which is connected with one end of the compression link 8, the other end of which is pivotally connected to the tractor. The standards 6 are braced against movement out of a vertical position by struts 11 extending between the upper ends thereof and the outer ends of the frame legs 2 and 3, the lower ends of the struts 11 being connected with lugs 12 secured to the frame legs 2 and 3 and their upper ends being connected with a pin 13 at the upper end of the standards 6. The draft bars 7 are of course provided with power-operated lift connections (not shown) for effecting pivotal movement thereof to elevate the harrow or other implement between transport and ground engaging positions. The relative locations of the pivots 9 and 10 form a triangle in a vertical plane and provide a connection commonly designated in the art as a three-point tractor hitch. Conventional hitches of this character tend to maintain the frame of the implement of which they form a part, such as the harrow frame 1, in a predetermined plane relative to the tractor which is determined by the surface of the ground over which the tractor may be moving. In this respect, it will be noted that the compression link 8 resists pivotal movement of the frame 1 about the draft connections 5 with respect to the tractor and thus holds the frame 1 in a fixed position relative to the tractor.

Figure 2:
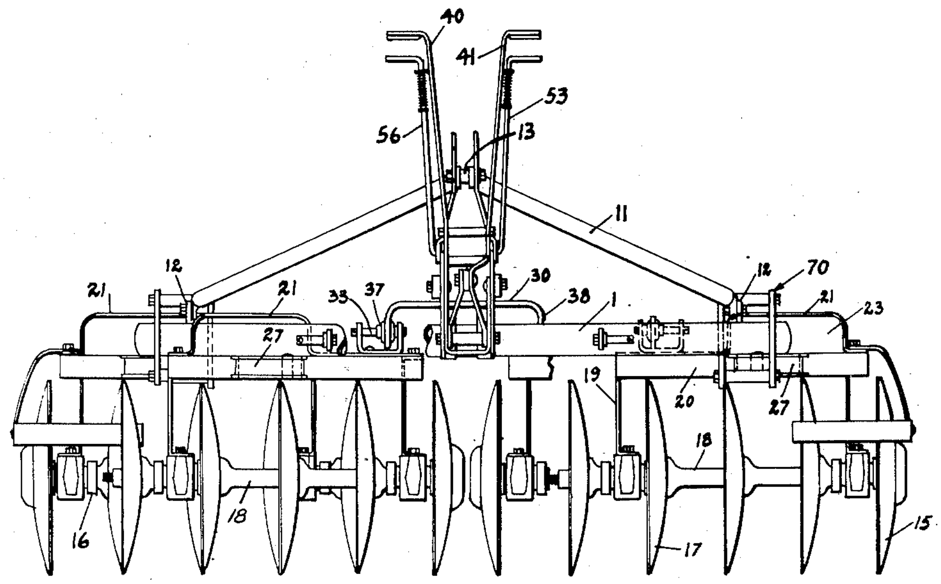
Fig. 2 is an end elevational view, parts thereof being broken away, looking from the front or left of the harrow shown in Fig. 1.

A plurality of gangs of harrow disks, respectively designated as a whole by the numeral 14, are arranged on the frame 1 in laterally spaced front and rear pairs 15 and 16. As best shown in connection with the frame arm 2 in Fig. 3, each of the arms 2 and 3 is positioned over one of the disk gangs 14 of each of the front and rear pairs 15 and 16. The structure of the gangs 14 forms no part per se of this invention, and it will be sufficient to indicate as shown best in Fig. 2 that each includes a plurality of disks 17 mounted on an axle 18 suspended by brackets 19 from a supporting frame 20. In accordance with this invention, each of the frames 20 has an inverted U-shaped bracket 21 secured to its upper surface and a U-shaped bracket 22 secured to the front side thereof to provide a universal connection of the disk gangs 14 on the overlying frame arms 2 and 3. The overlying portions of the frame arms 2 and 3 extend through spaces 23 between the brackets 21 and gang frames 20 as indicated by the dotted lines 24 and 25 in connection with the frame arm 2 in Fig. 3. Each portion of the frame overlying one of the gangs 14 is provided with a vertically depending pivot pin 26 which is received in a space 27 between a bracket 22 and a side of the gang frame 20 to provide for pivotal movement about a vertical axis. The portions 24 and 25 of the frame 1 extending through the brackets 21 act as pivots about which the gangs may tilt about horizontal axes. It will be noted that the brackets 21 and 22 have a length such that the disk gangs mounted thereby are permitted a self-adjusting axial movement with respect to the frame 1. While the brackets 21 and 22 represent a preferred embodiment of universal mounting for the gangs 14 on the frame 1, it will be understood that other forms of universal mountings are contemplated.

Front and rear crossbars respectively designated by the numerals 30 and 31 (see Figs. 3 and 4) are provided for adjusting the angular positions of the gangs 14 about the vertical frame pivots 26. The crossbars 30 and 31 form a part of a linkage system which controls the relative pivotal movements of the gangs 14 about horizontal axes, such linkage system being mounted for vertical movement as indicated above and in a manner to be described. Each of the gangs 14 has a single point of connection with this linkage system which is provided in part by an axially extending pin 33 mounted in the arms of a U-shaped bracket 34 secured to the upper surface of its frame 20 (see Fig. 3). The connection of the rear pair 16 of gangs 14 to the crossbar 31 is completed by a pair of laterally spaced arms 35 respectively secured to the crossbar 31 and having a ball and socket universal coupling 36 at its outer end which is slidable on a rear gang frame pin 33. In a similar manner, the connection of the front gangs 15 with the crossbar 30 is completed by ball and socket universal couplings 37 mounted in the depending end portions 38 (see Fig. 2) at the outer ends of the crossbar 30, the couplings 37 being slidable on the pins 33 of the front gangs 15. It will be noted that the pins 33 have a length such that limited axial movement is permitted the gangs on which they are mounted without interference from their connections with the crossbars 30 and 31. It will also be noted that the connections 36 of the rear crossbar 31 with the rear gangs 16 are located at points similarly disposed on the gangs 16 and respectively inwardly of their vertical pivots 26, and that the connections 37 of the front crossbar 30 with the front gangs 15 have a similarly disposed location inwardly of the pivots 26. By reason of these locations, forward and rearward movements of the front and rear crossbars 30 and 31 are effective to adjust the angular positions of the front and rear of pairs of gangs 15 and 16 about their vertical pivots 26. In addition, the couplings 36 and 37 form part of the linkage system for controlling the movement of the gangs 14 horizontally about their mounting arms 2 and 3 in a manner to be described.

Figure 3:
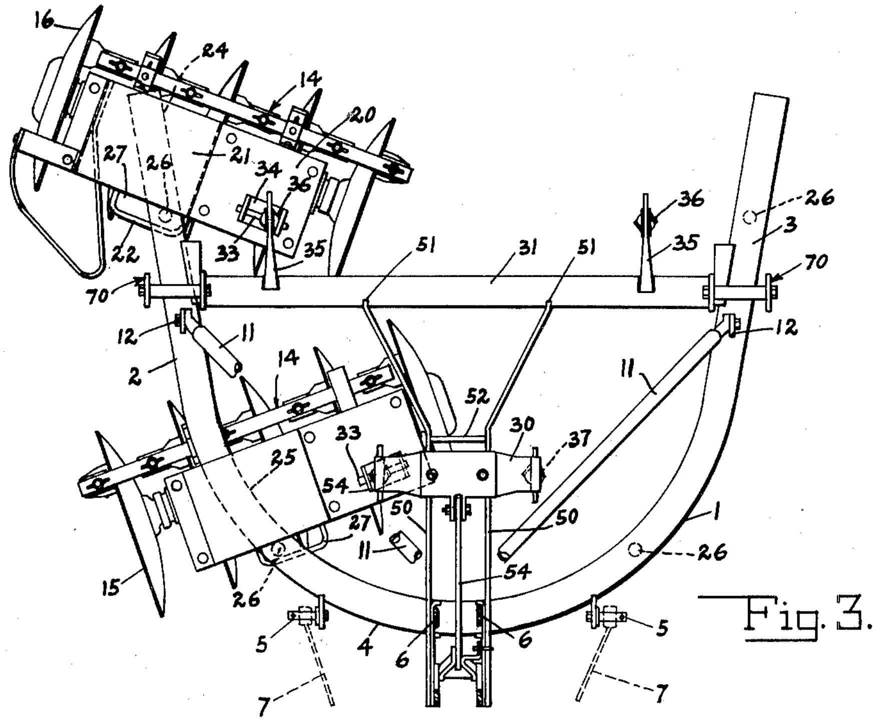
Fig. 3 is a partial plan view of the harrow shown in Fig. 1 and Fig. 2, the front and rear harrow gangs at the right of the frame having been omitted.
Figure 11:
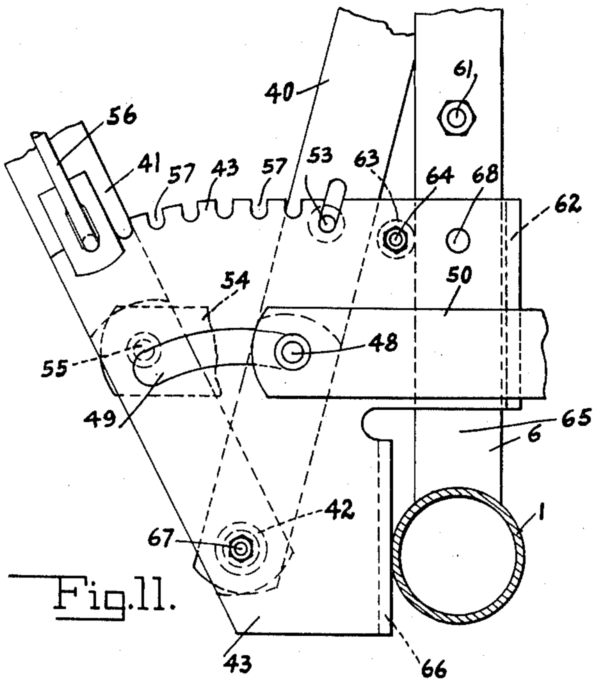
Fig. 11 is an enlarged and fragmentary elevational view of the preferred embodiment of vertically movable bracket and linkage operating levers which mount the linkage system for vertical movement with respect to the harrow frame.
Figure 13:
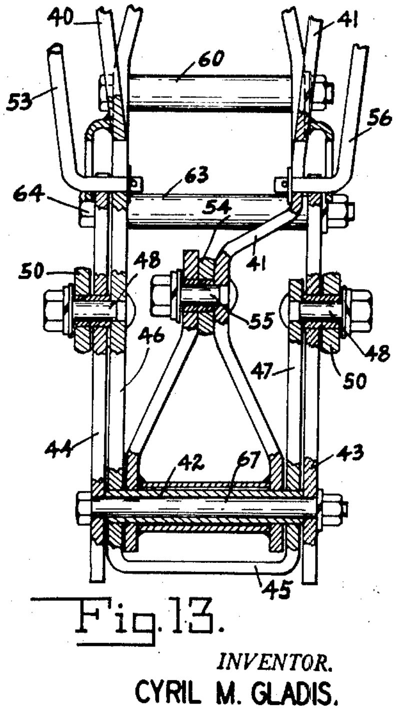
Fig. 13 is a view looking from the left of Fig. 11, with portions thereof broken away and shown in vertical section.

To control the pivotal movement of the gangs 14 about horizontal axes defined by the frame arms 2 and 3, the crossbars 30 and 31 and the linkage system of which they form a part are mounted for common vertical movement with respect to the frame 1. This linkage system includes a rear gang lever 40 and a front gang lever 41 (see Fig. 1) which are respectively operable to adjust the angular positions of the rear and front gangs 16 and 15 and which have a common pivot support (see Figs. 11 and 13) provided by a pivot 42. The pivot 42 has its end supported in bracket plates 43 and 42 which are mounted for vertical movement on the stationary frame standards 6 in a manner to be described. Referring to Fig. 13, the lower end 45 of the rear gang lever 40 has a U-shape providing spaced arms 46 and 47 mounting actuating pins 48 which extend through arcuate slots 49 in the bracket plates 43 and 44 (Fig. 11). The pins 48 are respectively connected with the ends of a pair of laterally spaced actuating links 50 extending along the outer sides of the bracket plates 43 and 44. As shown in Figs. 3 and 4, the actuating links 50 extend rearwardly and are secured at laterally spaced points 51 to the crossbar 31, and have a reinforcing bar 52 extending between their diverging end portions for bracing purposes. Pivotal movement of the rear gang lever 40 about the pivot pin 42 is effective to move the actuating links 50 forwardly and rearwardly to impart a similar movement to the crossbar 31 for adjusting the angular positions of the rear gangs 16 about their vertical pivot pins 26. As shown in Fig. 13, the rear gang lever 40 is provided with a latch bar 53 having an inturned part at its lower end engageable in notches along the upper edge of the bracket plate 44 for securing it in any angular position to which it is pivoted.

Forward and rearward movement of the crossbar 30 for controlling the angular positions of the front gangs 15 in a similar manner is effected by an actuating link 54 which has its rear end pivoted to the crossbar 30 and its forward end connected with a pivot pin 55 secured to the front gang lever 41 at a point spaced from its mounting pivot 42 (see Fig. 13). The front gang lever 41 is provided with a latch bar 56 having an inturned part at its lower end which engages in notches 57 along the upper edge of the bracket plate 43 for securing it in any position of adjustment to which it may be moved. The upper edge of the bracket plate 44 has notches shaped similar to the notches 57 in the upper edge of bracket plate 43.

Figure 12:
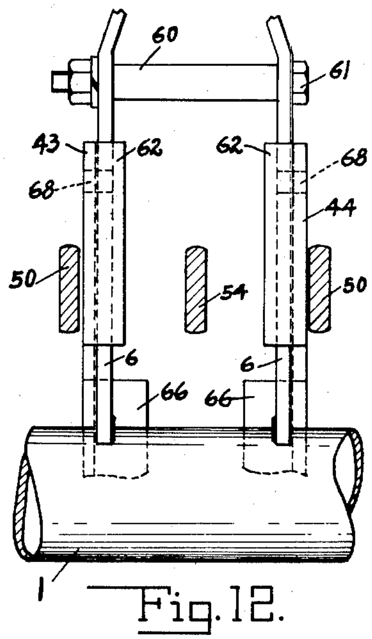
Fig. 12 is an elevational view in fragmentary section looking from the right of Fig. 11.

As indicated above and as best shown in Figs. 11 and 12, the bracket plates 43 and 44 are mounted for vertical movement with respect to the vertical standards 6. As illustrated in Fig. 12, the plates 43 and 44 are respectively positioned between one of the links 50 and a standard 6. A spacing tube 60 mounted by a bolt 61 reinforces and maintains the standards 6 in laterally spaced relation and limits the upward movement of the bracket plates 43 and 44 thereon. The bracket plates 43 and 44 each have inturned flanges 62 at their rear edges in sliding engagement with the standards 6 along one vertical edge thereof. A tube or roller (see Fig. 13) 63 extends between and is mounted on the plates 43 and 44 by a bolt 64, the roller 63 having rolling engagement with the opposite edges of the standards 6. The lower portions of the plates 43 and 44 are recessed as at 65 above the frame 1 and have inturned flanges 66 in sliding engagement with the forward edge of the frame 1. The flanges 62 and 66 together with the roller 63 guide the vertical movement of the bracket plates 43 and 44 on the standards 6.

Referring to Fig. 13, it will be noted that the pivot tube 42 is mounted on a bolt 67 and that the assembly of the bolt 67 and tube 42 is effective to hold the bracket plates 43 and 44 in laterally spaced relation. In the same manner, the assembly of the roller tube 63 and bolt 64 is effective to maintain the laterally spaced relation of the plates 43 and 44. As shown in Fig. 12, the standards 6 and plates 43 and 44 have aligned openings 68 for the reception of locking pins (not shown) to lock the bracket plates against vertical movement on the standards 6. By locking the bracket plates 43 and 44 against vertical movement in this manner, a rigid mounting is provided for the disk gangs 14. A rigid mounting of this character may be desired when the harrow is being used to till level ground.

In any given position of adjustment of the front and rear gang levers 41 and 40, their respective lock bars 53 and 56 are effective to prevent pivotal movement thereof out of their adjusted positions with respect to the mounting plates 43 and 44. In addition, the pivot pins 48 and 55 tie the forward ends of the links 50 and 54 to the levers 40 and 41 and thus secure such links against movement relative to the bracket plates 43 and 44. In this manner, the bracket plates 43 and 44 provide a mounting for the forward end of the linkage system which is vertically movable with respect to the frame 1.

Figure 5:
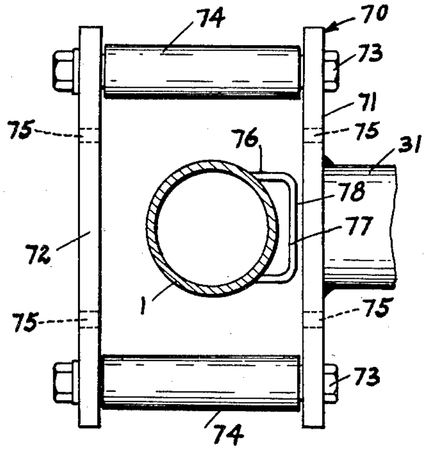
Fig. 5 is an enlarged sectional and elevational view taken substantially in the plane of the line V—V of Fig. 4.
Figure 6:
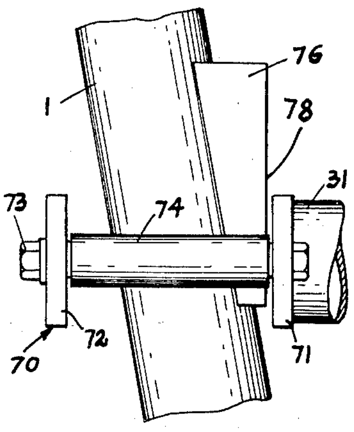
Fig. 6 is a plan view of the structure shown in Fig. 5.

The rearward end of the linkage system also has a mounting for vertical movement with respect to the frame 1 which is provided by the rear crossbar 31. For this purpose, the ends of the crossbar 31 respectively have assemblies, designated respectively as a whole by the numeral 70 which guide the movement of the crossbar 31 with respect to the frame 1. As best shown in Figs. 5 and 6, each of the assemblies 70 comprises a vertical plate 71 secured to an end of the crossbar 31, and a similar vertical plate 72 mounted in spaced relation thereto by a pair of bolts 73 respectively positioned above and below the frame 1. The bolts 73 mount rollers 74 which engage with the upper and lower surfaces of the frame 1 to limit vertical movement of the crossbar 31 and which have rolling engagement with the frame 1 in the extreme vertical positions of the crossbar 31. The plates 71 and 72 have aligned pairs of openings 75 for the reception of lock pins (not shown) to prevent vertical movement of the assemblies 70 with respect to the frame 1 when a rigid mounting for the linkage system is desired. When lock pins (not shown) are inserted through the openings 75, they engage with the upper and lower edges of the frame 1 to hold the assemblies 70 and crossbar 31 against vertical movement with respect to the frame. The inner edges of the frame 1 are provided with wedge shaped channels 76, the webs 77 of which provide guide surfaces 78 which engage with the plates 71 to guide the forward and rearward movement of the crossbar 31 in adjusting the angular position of the rear gangs 16.

From the foregoing, it will be apparent that the bracket plates 43 and 44 at the forward end of the linkage system and the assemblies 70 at the rearward end thereof form a mounting for the linkage system on the frame 1 which allows it to move vertically with respect thereto.

Figure 10:
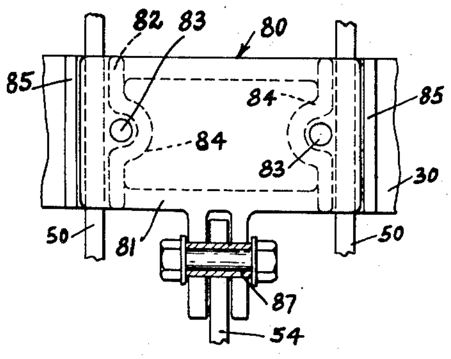
Fig. 10 is an enlarged plan view of the structure shown in Fig. 9.
Figure 9:
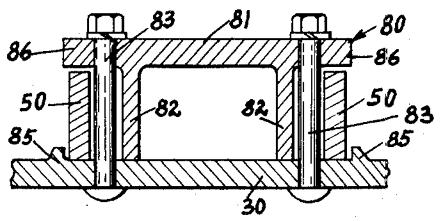
Fig. 9 is an enlarged sectional view taken substantially along the line IX—IX of Fig. 4.

The mounting of the crossbar 30 is in the nature of a saddle asembly, designated as a whole by the numeral 80, having provisions for sliding movement along the spaced links 50 which restrain it against transverse or vertical movement relative thereto. In this respect, it will be recalled that the links 50 have their front ends tied to the mounting brackets 43—44 and their rear ends tied to the rear crossbar 31. The action of the saddle assembly 80 in restraining the crossbar 30 against vertical movement relative to the links 50 is thus effective to restrain it against vertical movement relative to the rear crossbar 31 so that neither of the crossbars 30 or 31 can move vertically without imparting a vertical movement to the linkage system and to the other of the crossbars for a purpose to be described. As shown in Figs. 9 and 10, the asembly 80 comprises a saddle member 81 having depending legs 82, the lower ends of which engage with the crossbar 30 and space it with respect to the crossbar 30. Bolts 83 secure the saddle member 81 to the crossbar 30, the legs 82 having semi-circular recesses 84, as best shown in Fig. 10, providing spaces for the reception of the bolts 83. The legs 82 are parallel to the links 50 and have sliding engagement with the inner surfaces thereof. The crossbar 30 has a pair of transversely extending ribs 85 respectively positioned outwardly of the links 50 and which cooperate with the saddle legs 82 to guide the relative movement of the assembly 80 lengthwise of the links 50 and which restrain lateral movement of the links 50 relative to the assembly 80. The ends 86 of the saddle member 81 extend outwardly over the links 50 and confine the links 50 to the space between the ends 86 and the upper surface of the crossbar 30 so that the crossbar 30 cannot move vertically relative to the links 50.

A pivot assembly 87 connects the rear end of the link 54 to saddle assembly 80 so that forward and rearward movement of the link 54 is effective to slide the assembly 80 and the crossbar 30 lengthwise with respect to the links 50 for adjusting the angular positions of the front gangs 15 as described above. The connection of the link 54 to the saddle assembly 80 and with the rear brackets 43—44 through the front gang operating lever 41 secures it against vertical movement relative to the linkage system.

Figure 7:
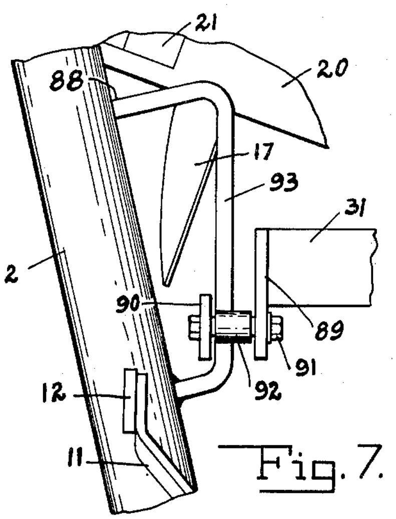
Fig. 7 is a plan view similar to Fig. 6 of a modified construction.
Figure 8:
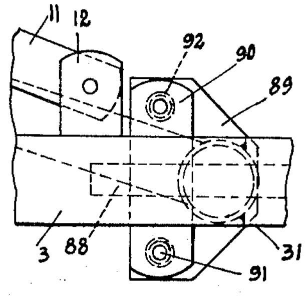
Fig. 8 is a side elevational view of the connection at the other side of the frame corresponding to the modified construction shown in Fig. 7.

A modified mounting for the crossbar 31 is illustrated in Figs. 7 and 8. In this showing, the frame arms 2 and 3 are shown as having brackets 88 secured to the inner edges thereof. Spaced plates 89 and 90 are secured to each end of the crossbar 31 by upper and lower bolts 91 which respectively mount rollers 92. The plates 89 and 90 are positioned on opposite sides of a guide strap 93 forming a part of the bracket 88. The outer plate 90 is positioned adjacent the guide strap 93 and guides the movement of the crossbar 31 forwardly and rearwardly. The rollers 92 limit the upper and lower vertical positions of the crossbar 31 with respect to the bracket 88 in the same manner as accomplished by the assembly 70 described above in connection with Figs. 5 and 6.

Figure 14:
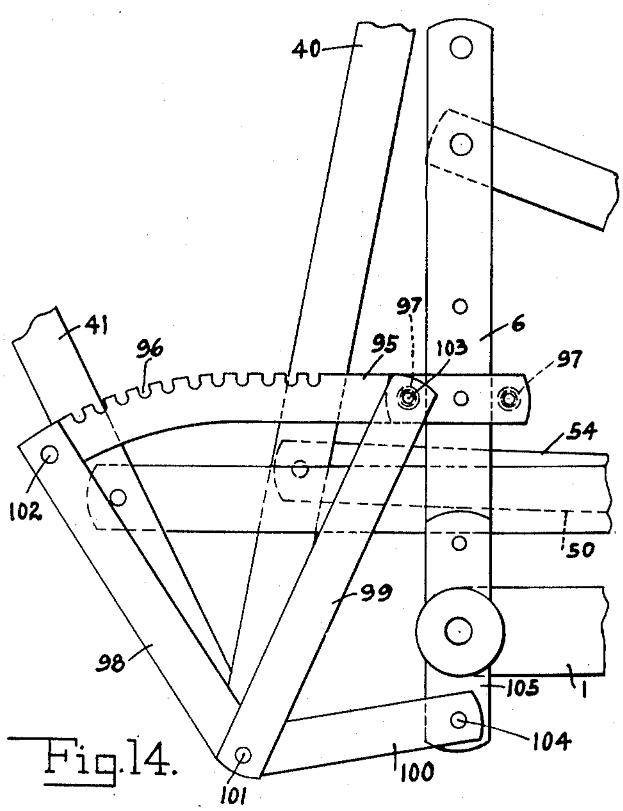
Fig. 14 is a side elevational view of a modified structure mounting the linkage system for vertical movement.

A modified form of bracket asembly for use in place of the assembly provided by the bracket plates 43—44 is shown in Fig. 14. In this showing, the supports 6 are mounted on the frame 1 as described above. In place of the bracket plates 43—44, a pair of straps 95 are positioned respectively alongside the outer surfaces of the standards 6 in the manner of the plates 43—44 described above. Only one of the standards 6 and straps 95 is visible in Fig. 14 but it will be understood that the second strap 95 is positioned on the far side of the second standard 6 as viewed in Fig. 14. The upper edges of the straps 95 have notches 96 for locking the gang levers 41 and 40 in the manner of the notches 57 on the plates 43—44. The laterally spaced straps 95 mount a pair of roller assemblies 97 which are positioned on opposite sides of the standards 6 and have rolling engagement with opposite edges thereof and guide the vertical movement of the straps 95 in addition to maintaining such straps in spaced relation. Three links 98, 99 and 100 mount the straps 95 for vertical movement with respect to the frame 1. These links have a common pivot at 101 which in addition forms a pivotal support for the gang levers 40 and 41 in the manner of the pivot assembly 42 described above. The other ends of the links 98, 99 and 100 respectively are connected by a pivot 102 to the front ends of the straps 96, by a pivot 103 adjacent the standards 6 to the forward end of the straps 95, and by a pivot 104 to a stationary support 105 depending from the frame 1. The operating links 50 and 54 are connected respectively to the gang levers 40 and 41 as described above and are thus secured to the linkage system comprised of the straps 95 and the links 98, 99 and 100. As the gang levers 40 and 41 move vertically with the linkage system to which they are connected, the links 98, 99 and 100 pivot so that the straps 95 move vertically with respect to the standards 6.

The assembly and structure of the harrow will be apparent as described above. In operation, the angular positions of the front and rear gangs 15 and 16 are adjusted about their respective vertical pivots 26 by operation of the gang levers 40 and 41. Operation of the rear gang lever 40, through the connected links 50, rear crossbar 31 and connections 36 is effective to adjust the angular position of the rear gangs 16. In a similar manner, operation of the front gang lever 41 is effective through the connected link 54, crossbar 30 and connections 37 to adjust the angular positions of the front gangs 15. In addition, the universal mounting of all of the gangs 14 provided by their respective U-shaped brackets 21 on the frame 1 provides for adjusting movement of the gangs 14 about horizontal axes or about the frame arms 2 and 3.

Since the mounting of the gangs 14 provides for their pivotal movement about horizontal axes, it will be apparent that the gangs 14 in the pairs 15 and 16 will be effective to work opposite sides of a ridge or of a gully along which the tractor to which it is attached may be moving. The gangs will automatically move about their horizontal axes to positions determined by the slope of the ground surface being worked. However, movement of the gangs 14 about their respective horizontal axes, and through their connections 36 to the crossbar 31 and their connections 37 to the crossbar 30, imparts a vertical movement to the linkage system formed in part by the crossbars 30 and 31, and the extent of such angular movement is limited only by the vertical movement permitted the linkage system on the standards 6. When the gangs 14 and the pairs 15 and 16 are working the opposite sides of a ridge, the linkage system will be in an upper position relative to the standards 6, and, when working the sides of a gully, will be in a lower position relative to the standards 6. When tilling a flat surface, the linkage system will be in an intermediate position corresponding to that in which it is held when locking pins are inserted through the aligned openings 68 (see Figs. 11 and 12) and through the pairs of openings 75, (see Fig. 5) as explained above.

With the linkage system in any given vertical position relative to the standards 6 as determined by the surface of the ground, the weight transfer action from one gang to another provided by the linkage system of this invention will be best understood by considering the action which takes place when one of the gangs is rolled over an obstacle such as a clod or mound of dirt in its path of movement. As one of the gangs rolls over such obstacle, the obstacle will tend to rotate it about a horizontal axis, that is, the arm of the frame to which it is connected. However, since such gang is connected to one of the crossbars 30 or 31, it cannot tilt about a horizontal axis in this manner without imparting a vertical movement to the linkage system with which it is connected. The linkage system is of course connected with the remaining gangs and their weight is effective to resist vertical movement of the linkage system. Accordingly, it will be apparent that a vertical movement of the linkage system by a tilting movement of one of the gangs is resisted by the remaining gangs and results in a portion of the weight of the remaining gangs being transferred to the one gang tending to tilt which thus becomes more effective in breaking up the clod or mound of dirt over which it is moving. In addition, the linkage system is effective to prevent one of the gangs from dropping, for example, into a hole in its path of movement. In such case, it will be supported against tilting movement by the linkage system which will be held against downward vertical movement by the remaining gangs, and the weight of the one gang will be transferred to the remaining gangs to render them more effective to level the surface of the ground to the level of the depression over which the one gang may be moving. Attention is particularly directed to the fact that the weight transfer action between the various gangs is effected without disturbing the position of the harrow frame 1 relative to the tractor to which it is connected. Attention is also directed to the fact that the weight of the frame 1 and downward forces applied thereto by the tractor hitch connection are uniformly distributed by the linkage system of this invention between the gangs 14 of the front and rear pairs 15 and 16.

While the apparatus described above and shown in the drawings represents a preferred embodiment of the invention, it will be understood that this is merely by way of illustration, and that various changes and modifications may be made therein within the contemplation of the invention and under the scope of the following claims.

I claim:

1. In a disk harrow having front and rear pairs of laterally spaced gangs of disks, a frame arranged in a horizontal plane and having portions overlying each of said gangs, a universal mounting connecting each of said gangs to an overlying frame portion in a position with the longitudinal axis of each gang extending transversely of said frame, a linkage system controlling the angular movements of said gangs about their respective said universal mountings and including a front crossbar having connections with adjacent portions of said front pair of gangs, a rear crossbar having connections with adjacent portions of said rear pair of gangs, and means for moving said crossbars forwardly and rearwardly with respect to said frame for adjusting the angular positions of said gangs transversely with respect to said frame, and means interconnecting and mounting said linkage system for movement vertically with respect to said frame whereby tilting movement of one of said gangs about a horizontal axis imparts a vertical movement to said linkage system and is resisted by the remaining gangs through their said connections with said crossbars.

2. In a disk harrow having front and rear pairs of laterally spaced gangs of disks, a frame arranged in a horizontal plane and having portions overlying each of said gangs, a universal mounting connecting each of said gangs to an overlying frame portion in a position with the longitudinal axis of each gang extending transversely of said frame, a linkage system controlling the angular movements of said gangs about their respective said universal mountings and including a front crossbar having connections with adjacent portions of said front pair of gangs, a rear crossbar having connections with adjacent portions of said rear pair of gangs, and means for moving said crossbars forwardly and rearwardly with respect to said frame for adjusting the angular positions of said gangs transversely with respect to said frame comprising a first operating link movable forwardly and rearwardly and connected with said front crossbar, a second operating link movable forwardly and rearwardly and connected with said rear crossbar, and means interconnecting said links and crossbars against vertical movement relative to each other, and means mounting said linkage system for movement vertically with respect to said frame whereby tilting movement of one of said gangs about a horizontal axis imparts a vertical movement to said linkage system and is resisted by the remaining gangs through their said connections with said crossbars.

3. A harrow as claimed in claim 2 characterized by said front crossbar having a saddle mounting it for sliding movement on said second operating link and forming a part of said interconnecting means.

4. A harrow as claimed in claim 2 characterized by said frame and the ends of said rear crossbar having means providing a sliding guide for the forward and rearward movement of said rear crossbar by said second operating link and permitting limited vertical movement of said rear crossbar in response to vertical movement of said linkage system.

5. In a disk harrow having front and rear pairs of laterally spaced gangs of disks, a frame having a pair of laterally spaced and rearwardly extending arms, each of said arms overlying one of the gangs in each of said pairs and with all of the gangs extending transversely of the arms underneath which they are respectively positioned, each of said gangs having a universal connection with the frame arm overlying the same, a rear crossbar having end portions connected with said frame for horizontal and vertical movement with respect thereto and having connections at laterally spaced points with said rear gangs near the inner ends thereof, a pair of laterally spaced links respectively connected with said rear crossbar and arranged between and centrally of said arms for moving said rear crossbar forwardly and rearwardly to adjust the angular position of said rear gangs, a front crossbar having a saddle mounting it for forward and rearward sliding movement on said pair of links and restraining it from vertical movementt relative thereto, said front crossbar having connections at its ends with said front gangs near the inner ends thereof, an actuating link connected with said front crossbar and arranged between and centrally of said arms for moving said front crossbar forwardly and rearwardly to adjust the angular position of said front pair of gangs, and means interconnecting and mounting said actuating link and said pair of laterally spaced links at points spaced forwardly of their respective points of connection with said crossbars for vertical movement with respect to said frame.

6. A harrow as claimed in claim 5 characterized by said last named means comprising a standard extending vertically upwardly from the front end of said frame, a bracket mounted for vertical movement on said standard, and means connecting said actuating link and said pair of laterally spaced links with said bracket for vertical movement therewith.

7. The invention defined in claim 6 characterized by said vertical standard comprising part of a conventional tractor hitch of the type including laterally spaced draft bars and a centrally positioned compression link, the upper end of said standard having provisions for connection to the compression link of said tractor hitch.

8. A harrow as claimed in claim 5 characterized by said last named means comprising a standard extending vertically upwardly from the front end of said frame, a bracket mounted for vertical movement on said standard, a pair of operating levers having pivotal connections with said bracket, and a pair of pivots respectively connecting said actuating link to one of said levers and said pair of links to the other of said levers whereby operation of said levers is effective to adjust the positions of said crossbars, said lever pivotal connections and said pivots being effective to interconnect said links and bracket against relative vertical movement therebetween.

9. In a disk harrow having a pair of laterally spaced gangs of disks, a frame arranged in a horizontal plane and having portions overlying each of said gangs, a universal mounting connecting each of said gangs to the portion of said frame overlying it and with the longitudinal axis of each gang extending transversely of said frame, a crossbar extending transversely of said frame and having connections at laterally spaced points with said gangs near adjacent and inner edges thereof, a linkage system for moving said crossbar forwardly and rearwardly to adjust the angular positions of said gangs about axes extending vertically of the frame, means mounting said crossbar and linkage system for vertical movement with respect to said frame whereby tilting movement of one of said gangs about a horizontal axis in one pivotal direction with respect to said frame is effective to move said crossbar and linkage system vertically and thus impart a tilting movement in an opposite pivotal direction to the other of said gangs.

10. In a disk harrow having a pair of laterally spaced gangs of disks, a frame arranged in a horizontal plane and having portions overlying each of said gangs, a universal mounting connecting each of said gangs to the portion of said frame overlying it and with the longitudinal axis of each gang extending transversely of said frame, a crossbar extending transversely of said frame and having connections at laterally spaced points with said gangs near adjacent and inner edges thereof, a linkage system for moving said crossbar forwardly and rearwardly to adjust the angular positions of said gangs about axes extending vertically of the frame, a standard extending vertically upwardly from the forward end of said frame, a bracket mounted for vertical movement on said standard, and means connecting said linkage system and crossbar with said bracket for vertical movement therewith.

11. In a disk harrow having a pair of laterally spaced gangs of disks, a frame arranged in a horizontal plane and having portions overlying each of said gangs, a universal mounting connecting each of said gangs to the portion of said frame overlying it and with the longitudinal axis of each gang extending transversely of said frame, a crossbar extending transversely of said frame and having connections at laterally spaced points with said gangs near adjacent and inner edges thereof, a linkage system for moving said crossbar forwardly and rearwardly to adjust the angular positions of said gangs about axes extending vertically of the frame, a standard extending vertically upwardly from the forward end of said frame, a bracket mounted for vertical movement on said standard, an operating lever having a pivotal connection with said bracket, and a pivot spaced from said pivotal connection and connecting said linkage system to said lever whereby operation of said lever is effective to move said crossbar to adjust the angular positions of said gangs, said pivot and pivotal connection being effective to interconnect said linkage system and crossbar against vertical movement relative to each other.

12. A harrow as claimed in claim 11 characterized by said linkage system including a pair of laterally spaced elements connected at spaced points on both said bracket and crossbar for restraining tilting movement of said crossbar relative to said bracket.

13. In a disk harrow having at least a pair of laterally spaced gangs of disks, a frame having provisions at its forward end for connection in a conventional three-point tractor hitch and which when so connected maintain the frame in a predetermined plane relative to the tractor to which it is connected, said provisions including a pair of laterally spaced draft connections and a standard extending vertically and positioned centrally of said draft connections, a pair of universal mountings respectively connecting said gangs to said frame in laterally spaced relation with the longitudinal axis of each gang extending transversely of said frame, a linkage system extending centrally of said frame from front to rear and having connections with said gangs respectively at points inwardly of their respective universal mountings for adjusting the angular positions of said gangs transversely of said frame, and means mounting said linkage system for vertical movement with respect to said frame including a bracket mounted for vertical movement on said standard and connected with said linkage system whereby tilting movement of one of said gangs about a horizontal axis imparts a vertical movement to said linkage system and is resisted by the other of said gangs without disturbing the planar position of said frame.

14. In a disk harrow having at least a pair of laterally spaced gangs of disks, a frame having provisions at its forward end for connection in a conventional three-point tractor hitch and which when so connected maintain the frame in a predetermined plane relative to the tractor to which it is connected, said provisions including a pair of laterally spaced draft connections and a standard extending vertically and positioned centrally of said draft connections, a pair of universal mountings respectively connecting said gangs to said frame in laterally spaced relation with the longitudinal axis of each gang extending transversely of said frame, a crossbar having connections at its ends with each of said gangs respectively at points inwardly of their respective universal mountings, a linkage system extending centrally of said frame from front to rear and connected with said crossbar for operating it to adjust the angular positions of said gangs transversely of said frame, and means mounting said crossbar and linkage system for vertical movement with respect to said frame including a bracket mounted for vertical movement on said standard and connected with said linkage system whereby tilting movement of one of said gangs about a horizontal axis imparts a vertical movement to said linkage system and is resisted by the other of said gangs without disturbing the planar position of said frame.

15. In a disk harrow having front and rear pairs of laterally spaced gangs of disks, a frame having provisions at its forward end for connection in a conventional three-point tractor hitch and which when so connected maintain the frame in a predetermined plane relative to the tractor to which it is connected, said provisions including a pair of laterally spaced draft connections and a standard extending vertically and positioned centrally of said draft connections, each of said gangs having a universal mounting connecting it to said frame with the longitudinal axis of the gang extending transversely of said frame, a linkage system extending centrally of said frame from front to rear and having connections with said gangs respectively at points inwardly of their respective universal mountings for adjusting the angular positions of said gangs transversely of said frame, and means mounting said linkage system for vertical movement with respect to said frame including a bracket mounted for vertical movement on said standard and connected with said linkage system whereby tilting movement of one of said gangs about a horizontal axis imparts a vertical movement to said linkage system and is resisted by the other of said gangs without disturbing the planar position of said frame.

16. The invention as defined in claim 6 wherein the connection between said rear cross bar and the frame and the connection between said bracket and the standard are provided with means for selectively restricting vertical movement between the connected members without otherwise interfering with the angular positioning of the gangs of disks through said cross bars.

17. A harrow as defined in claim 10 wherein said bracket and standard have registering portions which may be selectively connected for resisting vertical movement of said bracket independently of the operation of said linkage system.

References Cited in the file of this patent

UNITED STATES PATENTS

| | | |
|---|---|---|
| 1,104,748 | Waterman | July 21, 1914 |
| 1,505,196 | Hansen | Aug. 19, 1924 |
| 1,753,198 | Boda | Apr. 8, 1930 |
| 2,449,062 | Dewey | Sept. 14, 1948 |
| 2,649,279 | Nelson et al. | Nov. 16, 1954 |